(12) United States Patent
Itoh et al.

(10) Patent No.: US 6,306,452 B1
(45) Date of Patent: Oct. 23, 2001

(54) FEED FOR POULTRY

(75) Inventors: Tatsuroh Itoh; Seiji Kamiya; Yasuhiro Kurose; Takanobu Shimozawa, all of Tsukuba (JP)

(73) Assignee: National Federation of Agricultural Cooperative Associations, Tokyo (JP)

( * ) Notice: Subject to any disclaimer, the term of this patent is extended or adjusted under 35 U.S.C. 154(b) by 0 days.

(21) Appl. No.: 09/704,783

(22) Filed: Nov. 3, 2000

(30) Foreign Application Priority Data

Nov. 5, 1999 (JP) .................................................. 11-315445

(51) Int. Cl.$^7$ ........................................................ A23L 1/20
(52) U.S. Cl. ............................ 426/630; 426/635; 426/807
(58) Field of Search .................................... 426/630, 635, 426/807

(56) References Cited

U.S. PATENT DOCUMENTS 6,040,333 * 3/2000 Jackson ................................ 514/456

FOREIGN PATENT DOCUMENTS

81039176 * 9/1981 (JP) .
10-229829 9/1998 (JP) .

* cited by examiner

*Primary Examiner*—Chhaya D. Sayala
(74) *Attorney, Agent, or Firm*—Foley & Lardner

(57) ABSTRACT

The present invention provides a feed for poultry for increasing the egg weight in the early period of egg-laying by laying hens and preventing the decline of egg weight in the summer season.

Feed containing soybean germs or defatted soybean germs is given (to the hens).

2 Claims, No Drawings

FEED FOR POULTRY

TECHNICAL FIELD

The present invention relates to a feed for poultry. More particularly, the present invention relates to a feed for poultry blended with soybean germs or defatted soybean germs.

BACKGROUND ART

Hen's eggs are classified according to their weight under the MAFF (Ministry of Agriculture Forestry and Fisheries) Standards, and generally eggs in M size and L size of the Standards are traded at high prices. In the case of the eggs obtained in the early period of egg-laying, the percentage of the eggs which are less than M size is high. The egg weight increases with aging and the M size and L size eggs begin to be yielded, but the egg producers wish strongly to produce profitable size eggs from the early period of egg-laying for raising profit. Hitherto, the egg weight in the early period of egg-laying has been dependent on the fowl species and the body weight of the hen when it reached adulthood, and in the matter of improvement of feed, it has been generally tried to add methionine or fats/oils, but the effect thereof has been unsatisfactory. It has been reported that the egg weight could be increased by giving feed containing the whole soybean processed by an expander or an extruder (JP-A-10-229829). However, such processed soybean is expensive, and a more efficient technique for increasing the egg weight has been required for practical application.

Further, it is known that the feed intake by fowls reduces with a consequent decrease of egg weight during the period of severe heat in the summer season. This decrease of egg weight leads to a reduction of the percentage of the M size or L size eggs that can be marketed advantageously and a reduction of the gross weight of produced eggs. As for the technique for preventing the decrease of egg weight in the summer season, the addition system of methionine or fats and oils has been employed, but its effect is unsatisfactory.

DISCLOSURE OF THE INVENTION

The object of the present invention is to provide a feed for poultry for increasing the egg weight in the early period of egg-laying and preventing the decrease of egg weight in the summer season.

In order to solve the above problem, the present invention offers a feed containing soybean germs or defatted soybean germs in an amount of preferably 1.0 to 30% by weight. Generally, soybean contains about 2% of germs. The soybean germs used in the present invention are those extracted from the soybeans and containing 30% or more of germ essence. Such soybean germs may be either defatted germs, i.e. the germs from which the oil portion has been expressed out, or non-defatted germs. For instance, such germs can be obtained by heating the soybeans to bring them into a half-split state, then de-shelling the beans, sifting them and recovering the shell portions carrying the germs.

EXAMPLES

The effect of increasing the egg weight in the early period of egg-laying by giving the feed of the present invention is shown below.

Example 1

Feeds for poultry of the formulations shown in Table 1 were prepared, and they were given to the groups of 203-day-old laying hens (white leghorns), each group consisting of 90 hens, for a period of 8 weeks.

TABLE 1

| | Test feed formulations (unit: wt. %) | | | |
|---|---|---|---|---|
| Component materials | Control group 1 | Control group 2 | Control group 3 | Invention group |
| Cereals | 64.4 | 64.4 | 64.4 | 64.4 |
| Vegetable oil cakes | 15.0 | 15.0 | 15.0 | 15.0 |
| Animal feed | 7.5 | 7.5 | 7.5 | 7.5 |
| Fats and oils | 1.0 | 1.0 | 1.0 | 1.0 |
| Other materials | 9.1 | 9.1 | 9.1 | 9.1 |
| Soybean cakes | 3.0 | — | — | — |
| Wheat germs | — | 3.0 | — | — |
| Rice germs | — | — | 3.0 | — |
| Defatted soybean germs | — | — | — | 3.0 |

(Note) Vegetable oil cakes don't include soybean cakes.

The test results are shown in Tables 2 and 3. In the Invention group where feed containing defatted soybean germs was used, the egg weight changed greater than in any of the Control groups 1 to 3, with the average egg weight in the test period being increased by 0.6 g, 1.0 g and 1.0 g, respectively, over the Control groups 1 to 3. From this, it is found that a greater effect of promoting the increase of egg weight is provided by giving the feed containing defatted soybean germs than when the feeds containing soybean cakes, wheat germs and rice germs are given. A good result of egg laying was obtained in each group, but in the Invention group, the daily laid egg weight rose with the increase of the average egg weight, and the feed demand was also the highest.

TABLE 2

| | Shift of average egg weight (unit: ratio (%) to the average egg weight of the first week) | | | | | | | |
|---|---|---|---|---|---|---|---|---|
| | 1st week | 2nd week | 3rd week | 4th week | 5th week | 6th week | 7th week | 8th week |
| Control group 1 | 100.0 | 100.8 | 101.7 | 102.3 | 102.3 | 102.7 | 102.8 | 103.3 |
| Control group 2 | 100.0 | 100.8 | 101.3 | 101.8 | 101.7 | 102.3 | 101.8 | 102.7 |
| Control group 3 | 100.0 | 100.5 | 101.2 | 101.7 | 102.3 | 101.8 | 102.3 | 103.0 |
| Invention group | 100.0 | 101.7 | 102.2 | 102.7 | 103.2 | 103.8 | 104.5 | 105.6 |

TABLE 3

| | Egg laying performance in test period | | | | |
|---|---|---|---|---|---|
| | Egg laying rate (%) | Average egg weight (g) | Daily laid egg weight (g) | Feed intake (g/hen/day) | Feed demand |
| Control group 1 | 94.3 | 61.1 | 57.6 | 110.2 | 1.91 |
| Control group 2 | 93.8 | 60.7 | 56.9 | 111.0 | 1.95 |

TABLE 3-continued

Egg laying performance in test period

| | Egg laying rate (%) | Average egg weight (g) | Daily laid egg weight (g) | Feed intake (g/hen/day) | Feed demand |
|---|---|---|---|---|---|
| Control group 3 | 93.7 | 60.7 | 56.9 | 110.7 | 1.95 |
| Invention group | 95.0 | 61.7 | 58.6 | 110.1 | 1.88 |

Example 2

Feeds for poultry of the formulations shown in Table 4 were prepared and given to the groups of 120-day-old laying hens (white leghorns), each group consisting of 90 hens, for a period of 8 weeks.

TABLE 4

Test feed formulations (unit: wt. %)

| Raw materials | Control group | Invention group 1 | Invention group 2 | Invention group 3 | Invention group 4 | Invention group 5 |
|---|---|---|---|---|---|---|
| Cereals | 59.4 | 59.4 | 59.4 | 59.4 | 59.4 | 59.4 |
| Chaff and bran | 3.0 | 3.0 | 3.0 | 3.0 | 3.0 | 3.0 |
| Vegetable oil cakes | 11.7 | 11.7 | 11.7 | 11.7 | 11.7 | 11.7 |
| Animal feed | 5.0 | 5.0 | 5.0 | 5.0 | 5.0 | 5.0 |
| Fats and oils | 1.5 | 1.5 | 1.5 | 1.5 | 1.5 | 1.5 |
| Other materials | 9.4 | 9.4 | 9.4 | 9.4 | 9.4 | 9.4 |
| Soybean cakes | 10.0 | 8.0 | 6.0 | 4.0 | 2.0 | 0.0 |
| Defatted soybean germs | 0.0 | 2.0 | 4.0 | 6.0 | 8.0 | 10.0 |

(Note) Vegetable oil cakes don't include soybean cakes

The test results are shown in Tables 5 and 6. It is seen that the egg weight elevates as the amount of defatted soybean germs blended is increased. A good result of egg laying was obtained in each group, but in the Invention group, the daily laid egg weight ascended with the increase of average egg weight, and the feed demand was also the highest.

TABLE 5

Shift of average egg weight (unit: ratio (%) to the average egg weight of the first week)

| | 1st week | 2nd week | 3rd week | 4th week | 5th week | 6th week | 7th week | 8th week |
|---|---|---|---|---|---|---|---|---|
| Control group | 100.0 | 107.9 | 114.4 | 123.8 | 129.5 | 133.0 | 135.2 | 138.5 |
| Invention group 1 | 100.0 | 108.7 | 118.4 | 123.6 | 130.0 | 134.0 | 137.0 | 139.2 |
| Invention group 2 | 100.0 | 111.7 | 118.4 | 125.6 | 131.0 | 135.7 | 138.2 | 141.7 |
| Invention group 3 | 100.0 | 112.4 | 118.9 | 126.3 | 132.0 | 136.5 | 139.2 | 142.7 |
| Invention group 4 | 100.0 | 112.7 | 119.4 | 127.8 | 132.8 | 138.0 | 140.7 | 143.9 |
| Invention group 5 | 100.0 | 112.7 | 119.6 | 128.5 | 133.7 | 138.2 | 140.9 | 144.9 |

TABLE 6

Egg laying performance in test period

| | Egg laying rate (%) | Average egg weight (g) | Daily egg output (g) | Feed intake (g/hen/day) | Feed demand |
|---|---|---|---|---|---|
| Control group | 72.5 | 51.6 | 37.4 | 99.4 | 2.66 |
| Invention group 1 | 72.9 | 52.0 | 38.0 | 100.1 | 2.64 |
| Invention group 2 | 72.9 | 52.7 | 38.5 | 102.2 | 2.66 |
| Invention group 3 | 78.1 | 53.1 | 38.8 | 101.0 | 2.60 |
| Invention group 4 | 72.8 | 53.5 | 39.0 | 101.6 | 2.61 |
| Invention group 5 | 72.7 | 53.7 | 39.1 | 100.9 | 2.58 |

Example 3

Feeds of the formulations shown in Table 7 were prepared and given to the groups of 212-day-old laying hens (white leghorns), each group consisting of 120 hens, for a period of 12 weeks in the summer season (June to September).

TABLE 7

Test feed formulations (unit: wt. %)

| Raw materials | Control group | Invention group |
|---|---|---|
| Cereals | 60.7 | 61.9 |
| Chaff and bran | 3.0 | 2.0 |
| Vegetable oil cakes | 8.8 | 6.1 |
| Animal feed | 6.0 | 6.0 |
| Fats and oils | 2.0 | 1.5 |
| Other materials | 9.5 | 9.5 |
| Soybean cakes | 10.0 | 10.0 |
| Defatted soybean germs | 0.0 | 3.0 |

(Note) Vegetable oil cakes don't include soybean cakes.

The results are shown in Tables 8 and 9. In the Control group, the egg weight decreased with the rise of average atmospheric temperature. In the 8th week when the greatest decrease of egg weight was observed, the average egg weight dropped 5.1% from that at the start of the test. In the Invention group, however, the drop of egg weight was limited to 0.9% even in the 7th week when the decrease of egg weight was greatest. Regarding the egg laying performance in the test period, the Invention group excelled the Control by 4.3% in egg laying rate, 1.5 g in average egg weight and 3.8 g in daily yield of eggs. Thus, it was possible to suppress the decrease of egg weight as well as the drop of egg yield due to the rise of atmospheric temperature in the summer season by giving feed containing defatted soybean germs.

1 and 9.1% in the Invention group 2 than in the Control group. It was found that the egg weight increased with the increase of the amount of defatted soybean germs blended. A good result of egg laying was obtained in each group, with no difference being observed in egg laying rate and feed demand between the test groups.

TABLE 8

Shift of average egg weight (unit: ratio (%) to the average egg weight of the first week)

| | 1st week | 2nd week | 3rd week | 4th week | 5th week | 6th week | 7th week | 8th week | 9th week | 10th week1 | 11th week | 12th week |
|---|---|---|---|---|---|---|---|---|---|---|---|---|
| Control group | 100.0 | 99.7 | 98.8 | 99.0 | 99.3 | 97.8 | 95.7 | 94.9 | 95.9 | 96.3 | 98.6 | 97.4 |
| Invention group | 100.0 | 100.5 | 100.9 | 101.0 | 101.2 | 100.7 | 99.1 | 99.7 | 100.2 | 100.5 | 102.0 | 101.2 |
| Average temperature henhouse | 20.3 | 22.5 | 23.5 | 26.2 | 28.6 | 29.2 | 28.6 | 28.7 | 28.7 | 28.0 | 27.3 | 26.5 |

TABLE 9

Egg-laying performance in test period

| | Egg laying rate (%) | Average egg weight (g) | Daily egg output (g) | Feed intake (g/hen/day) | Feed demand |
|---|---|---|---|---|---|
| Control group | 86.4 | 57.6 | 49.8 | 95.5 | 1.92 |
| Invention group | 90.8 | 59.0 | 53.6 | 98.9 | 1.85 |

Example 4

Feeds for poultry of the formulations shown in Table 10 were prepared and given to the groups of 126-day-old laying hens (white leghorns), each group consisting of 400 hens, for a period of eight weeks.

TABLE 10

Test feed formulations (unit: wt. %)

| Raw materials | Control group | Invention group 1 | Invention group 2 |
|---|---|---|---|
| Cereals | 60.7 | 61.6 | 61.9 |
| Chaff and bran | 3.0 | 2.0 | 1.5 |
| Vegetable oil cakes | 8.8 | 7.2 | 5.5 |
| Animal feed | 6.0 | 6.0 | 6.0 |
| Fats and oils | 2.0 | 1.7 | 1.6 |
| Other materials | 9.5 | 9.5 | 9.5 |
| Soybean cakes | 10.0 | 10.0 | 10.0 |
| Defatted soybean germs | 0.0 | 2.0 | 4.0 |

(Note) Vegetable oil cakes do not include soybean cakes and defatted soybean germs.

The test results are shown in Tables 11 and 12. It was noted that in the Invention groups the egg weight increased greater than in the Control group after start of giving feed. The difference in egg weight in the period of 8 weeks after start of the test was greater by 3.3% in the Invention group

TABLE 11

Shift of average egg weight (unit: ratio (%) to the average egg weight of the first week)

| | 1st week | 2nd week | 3rd week | 4th week | 5th week | 6th week | 7th week | 8th week |
|---|---|---|---|---|---|---|---|---|
| Control group | 100.0 | 108.7 | 117.1 | 122.7 | 127.1 | 130.9 | 133.8 | 137.0 |
| Invention group | 100.0 | 100.0 | 118.2 | 124.5 | 129.4 | 133.5 | 136.9 | 140.3 |
| Invention group | 100.0 | 111.7 | 121.9 | 129.9 | 133.9 | 137.7 | 141.4 | 146.9 |

TABLE 12

Egg-laying performance in test period

| | Egg laying rate (%) | Average egg weight (g) | Daily laid egg weight (g) | Feed intake (g/hen/day) | Feed demand |
|---|---|---|---|---|---|
| Control group | 75.1 | 52.9 | 39.7 | 95.9 | 2.41 |
| Invention group 1 | 75.2 | 53.6 | 40.1 | 96.2 | 2.40 |
| Invention group 2 | 75.5 | 54.0 | 40.8 | 96.5 | 2.36 |

The ratios of the respective sizes (MAFF Standards) of eggs laid during the test period are as shown in Table 13. The ratios of M and L sizes, which are advantageous in selling price, increased 39% and 100%, respectively, in the Invention group 1 and 45% and 240%, respectively, in the Invention group 2 in comparison with the Control group. The result of a tentative calculation of the gainings in the 8-week test period based on the above findings is shown in Table 14. It was found that the selling price of the eggs produced by hens increased 8.7 yen per hen in the Invention group 1 and 20.6 yen per hen in the Invention group 2 in comparison with the Control group, and a substantial increase of earnings could be expected in large-scale poultry farming.

TABLE 13

Ratio of each size (ratio to Control group, %) of eggs yielded in test period

| | Larger than LL | LL | L | M | MS | S | SS | Smaller than SS |
|---|---|---|---|---|---|---|---|---|
| Control group | 100 | 100 | 100 | 100 | 100 | 100 | 100 | 100 |
| Invention group 1 | 75 | 100 | 200 | 133 | 94 | 90 | 87 | 100 |
| Invention group 2 | 90 | 122 | 340 | 145 | 90 | 82 | 76 | 88 |

(Note) LL: 70–76 g, L: 64–70 g, M; 58–64 g, MS: 52–58 g, S: 46–52 g, SS: 40–46 g

TABLE 14

Tentative calculation of gainings in test period (8 weeks)

| | Selling price (yen/hen) | Difference in selling price from control group (yen/hen) |
|---|---|---|
| Control group | 328.4 | — |
| Invention group 1 | 337.1 | 8.7 |
| Invention group 2 | 349.0 | 20.6 |

(Note) Basis for calculation From the average prices in Tokyo in 1998, investigated by ZEN-NOH (LL: 162 yen/kg; L: 172 yen/kg; M: 169 yen/kg; MS: 155 yen/kg; S: 147 yen/kg; SS: 94 yen/kg; the prices of eggs greater than LL or smaller than SS are not included in the selling prices).

What is claimed is:

1. A feed for poultry containing soybean germs or defatted soybean germs in a poultry feed.

2. A feed for poultry according to claim 1 wherein the soybean germs or defatted soybean germs are blended in an amount of 1% to 30% by weight.

* * * * *